(12) United States Patent
Dugar et al.

(10) Patent No.: US 11,861,669 B2
(45) Date of Patent: Jan. 2, 2024

(54) SYSTEM AND METHOD FOR TEXTUAL ANALYSIS OF IMAGES

(71) Applicant: Walmart Apollo, LLC, Bentonville, AR (US)

(72) Inventors: Pranay Dugar, Bangalore (IN); Anirban Chatterjee, Bally (IN); Saswata Sahoo, Kolkata (IN); Rajesh Shreedhar Bhat, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/152,271

(22) Filed: Jan. 10, 2023

(65) Prior Publication Data

US 2023/0169555 A1 Jun. 1, 2023

Related U.S. Application Data

(63) Continuation of application No. 16/940,578, filed on Jul. 28, 2020, now abandoned.

(Continued)

(30) Foreign Application Priority Data

Jul. 29, 2019 (IN) .............................. 201941030477

(51) Int. Cl.
*G06Q 30/0601* (2023.01)
*G06Q 10/087* (2023.01)
(Continued)

(52) U.S. Cl.
CPC ......... *G06Q 30/0603* (2013.01); *A47F 13/00* (2013.01); *B64C 39/02* (2013.01);
(Continued)

(58) Field of Classification Search
CPC ............ G06Q 30/0603; G06Q 10/083; G06Q 10/087; G06Q 30/0185; G06Q 30/0623;
(Continued)

(56) References Cited

U.S. PATENT DOCUMENTS 8,077,930 B2 * 12/2011 Hauke .................... G06V 20/40
382/118
8,150,166 B2 4/2012 Matsuda
(Continued)

FOREIGN PATENT DOCUMENTS

CA    2736750 A1    3/2010
CA    2815944 A1    5/2012
(Continued)

OTHER PUBLICATIONS

Borovec, Jiri et al.; "Supervised and unsupervised segmentation using superpixels, model estimation, and Graph Cut"; Journal of Electronic Imaging, 26(6):061610, 2017; pp. 1-23.
(Continued)

*Primary Examiner* — Mahendra R Patel
(74) *Attorney, Agent, or Firm* — Fitch, Even, Tabin & Flannery LLP

(57) ABSTRACT

Segmentation first breaks the images into segments or regions, with the segments of the region having text or symbols. The segmented image is separately applied to two different CNN-based models. Each model produces text boxes where potential text might exist. Then, a selective NMS algorithm is applied to the output of each model to produce a final group of text regions. These text regions are analyzed and actions are taken.

20 Claims, 5 Drawing Sheets

Related U.S. Application Data

(60) Provisional application No. 62/902,745, filed on Sep. 19, 2019.

(51) Int. Cl.

| | | |
|---|---|---|
| G06Q 10/083 | (2023.01) | |
| G06Q 30/018 | (2023.01) | |
| G06N 3/08 | (2023.01) | |
| G05D 1/02 | (2020.01) | |
| B65G 1/137 | (2006.01) | |
| B64C 39/02 | (2023.01) | |
| A47F 13/00 | (2006.01) | |
| G06T 7/11 | (2017.01) | |
| G06V 30/148 | (2022.01) | |
| G06F 18/214 | (2023.01) | |
| G06V 30/19 | (2022.01) | |
| G06V 10/82 | (2022.01) | |
| G06V 10/26 | (2022.01) | |
| B64U 101/60 | (2023.01) | |

(52) U.S. Cl.
CPC ......... B65G 1/1373 (2013.01); G05D 1/0212 (2013.01); G06F 18/214 (2023.01); G06N 3/08 (2013.01); G06Q 10/083 (2013.01); G06Q 10/087 (2013.01); G06Q 30/0185 (2013.01); G06Q 30/0623 (2013.01); G06T 7/11 (2017.01); G06V 10/26 (2022.01); G06V 10/82 (2022.01); G06V 30/153 (2022.01); G06V 30/19173 (2022.01); *B64U 2101/60* (2023.01); *G05D 2201/0216* (2013.01)

(58) Field of Classification Search
CPC ....... A47F 13/00; B64C 39/02; B65G 1/1373; G05D 1/0212; G05D 2201/0216; G06F 18/214; G06N 3/08; G06N 3/045; G06N 7/01; G06T 7/11; G06V 10/26; G06V 10/82; G06V 30/153; G06V 30/19173; B64U 2101/60

USPC ....................................................... 382/157
See application file for complete search history.

(56) References Cited

U.S. PATENT DOCUMENTS

| | | | |
|---|---|---|---|
| 8,732,014 B2 | 5/2014 | Kae | |
| 9,008,435 B2 * | 4/2015 | Gokturk ............ | G06Q 30/0603 |
| | | | 382/209 |
| 9,256,618 B2 * | 2/2016 | Ghatare ................. | G06Q 30/02 |
| 9,483,732 B1 * | 11/2016 | Milakovich ............ | H04H 60/94 |
| 10,410,261 B2 * | 9/2019 | Siddiqui ............ | G06Q 30/0201 |
| 10,922,957 B2 * | 2/2021 | Rhoads .............. | H04N 1/00307 |
| 2002/0099649 A1 * | 7/2002 | Lee .................... | G06Q 20/4016 |
| | | | 705/38 |
| 2007/0300142 A1 * | 12/2007 | King ...................... | G06Q 30/02 |
| | | | 382/181 |
| 2010/0010968 A1 * | 1/2010 | Redlich .................. | G06Q 10/00 |
| | | | 707/E17.046 |
| 2011/0110596 A1 * | 5/2011 | Matsuda ............... | G06V 30/413 |
| | | | 382/190 |
| 2012/0158525 A1 * | 6/2012 | Kae ........................ | G06Q 30/08 |
| | | | 705/14.73 |
| 2012/0281919 A1 * | 11/2012 | Abdulkader ......... | G06V 30/244 |
| | | | 382/177 |
| 2015/0154464 A1 * | 6/2015 | Manmatha .............. | G06F 18/25 |
| | | | 382/176 |
| 2017/0169315 A1 | 6/2017 | Vaca Castano | |
| 2020/0342252 A1 * | 10/2020 | Givental .............. | G08B 29/186 |
| 2021/0019566 A1 * | 1/2021 | Gandhi .................. | G06V 20/10 |
| 2021/0034907 A1 | 2/2021 | Dugar | |

FOREIGN PATENT DOCUMENTS

| | | | | |
|---|---|---|---|---|
| CA | 2888153 A1 * | 4/2014 | ........ | G06K 7/10861 |
| CA | 2888153 A1 | 4/2014 | | |
| CA | 2846273 A1 | 9/2014 | | |
| EP | 2521071 A2 | 11/2012 | | |
| WO | 9966426 A1 | 12/1999 | | |
| WO | WO-2007028166 A2 * | 3/2007 | ............. | G06K 9/325 |
| WO | WO-2010022185 A1 * | 2/2010 | ........ | G06D 23/1905 |
| WO | 2019199719 A1 | 10/2019 | | |
| WO | WO-2020194004 A1 * | 10/2020 | ............... | G06K 9/00 |

OTHER PUBLICATIONS

Gupta, Neha et al.; "Image Segmentation for Text Extraction"; 2nd International Conference on Electrical, Electronics and Civil Engineering (ICEECE'2012); Apr. 28, 2012; pp. 182-185.
Jaderberg, Max et al.; "Reading Text in the Wild with Convolutional Neural Networks"; International Journal of Computer Vision, 116(1); 2016; pp. 1-20.
Karatzas, Dimosthenis et al.; "ICDAR 2013 Robust Reading Competition"; 2013 12th International Conference on Document Analysis and Recognition; 2013; pp. 1484-1493.
Leung, Thomas et al.; "Representing and Recognizing the Visual Appearance of Materials using Three-dimensional Textons"; International Journal of Computer Vision, 43(1); 2001; pp. 29-44.
Liao, Minghui et al.; "TextBoxes: A Fast Text Detector with a Single Deep Neural Network"; Thirty-First AAAI Conference on Artificial Intelligence; 2017; pp. 1-7.
Liao, Minghui et al.; "TextBoxes++: A Single-Shot Oriented Scene Text Detector"; IEEE Transactions on Image Processing, 27(8); 2018; pp. 1-15.
Liu, Wei et al.; "SSD: Single Shot MultiBox Detector"; European Conference on Computer Vision; 2016; pp. 1-17.
Neumann, Lukáš et al.; "Real-Time Scene Text Localization and Recognition"; 25th IEEE Conference on Computer Vision and Pattern Recognition; 2012; pp. 1-8.
Singh, Bharat et al.; "An Analysis of Scale Invariance in Object Detection—SNIP"; Proceedings of the IEEE Conference on Computer Vision and Pattern Recognition; 2018; pp. 3578-3587.
Thum, CH.; "Measurement of the Entropy of an Image with Application to Image Focusing"; Optica Acta: International Journal of Optics, vol. 31, No. 2; 1984; pp. 203-211.
Tian, Shangxuan et al.; "Text Flow: A Unified Text Detection System in Natural Scene Images"; Proceedings of the IEEE International Conference on Computer Vision; 2015; pp. 1-9.
USPTO; U.S. Appl. No. 16/940,578; Notice of Allowance and Fees Due (PTOL-85) dated Oct. 11, 2022; (pp. 1-15).
Walmart Inc.; "Save Money. Live Better."; https://www.walmart.com/; accessed Apr. 14, 2019; pp. 1-10.
Zamberletti, Alessandro et al.; "Text Localization based on Fast Feature Pyramids and Multi-resolution Maximally Stable Extremal Regions"; Asian Conference on Computer Vision; 2014; pp. 1-15.
Zhang, Zheng et al.; "Multi-Oriented Text Detection with Fully Convolutional Networks"; Proceedings of the IEEE Conference on Computer Vision and Pattern Recognition; 2016; pp. 1-9.
Zhang, Zheng et al.; "Symmetry-Based Text Line Detection in Natural Scenes"; Proceedings of the IEEE Conference on Computer Vision and Pattern Recognition; 2015; pp. 2558-2567.

* cited by examiner

SYSTEM AND METHOD FOR TEXTUAL ANALYSIS OF IMAGES

CROSS-REFERENCE TO RELATED APPLICATIONS

This application is a continuation of U.S. application Ser. No. 16/940,578, filed Jul. 28, 2020, which claims the benefit of Indian Provisional Application No. 201941030477, filed Jul. 29, 2019, and U.S. Provisional Application No. 62/902,745, filed Sep. 19, 2019, all of which are incorporated herein by reference in their entireties.

TECHNICAL FIELD

These teachings relate to analyzing images in text and performing actions as a result of the analysis.

BACKGROUND

Detecting regions of text and extracting that information from natural images is a challenging problem due to the presence of multiple types of text in various shapes and sizes and having many other visual objects together. One area of text extraction is extracting text from product images, particularly in e-commerce, especially, when the intent is to extract brand information, product type, and/or various other attributes from a product label.

Large e-commerce companies sell billions of products through their websites. All these products are associated with one or more product images containing various textual information about them. Extracting this information not only to enhances the quality of the product catalogue but also facilitates comparison of accurate product information with respect to various compliance policies of the organization. One of the primary requisites to extract information from product images is to extract text from those images with high accuracy and coverage.

BRIEF DESCRIPTION OF THE DRAWINGS

The above needs are at least partially met through the provision of approaches for analysing images, wherein.

DETAILED DESCRIPTION

Figure 1:
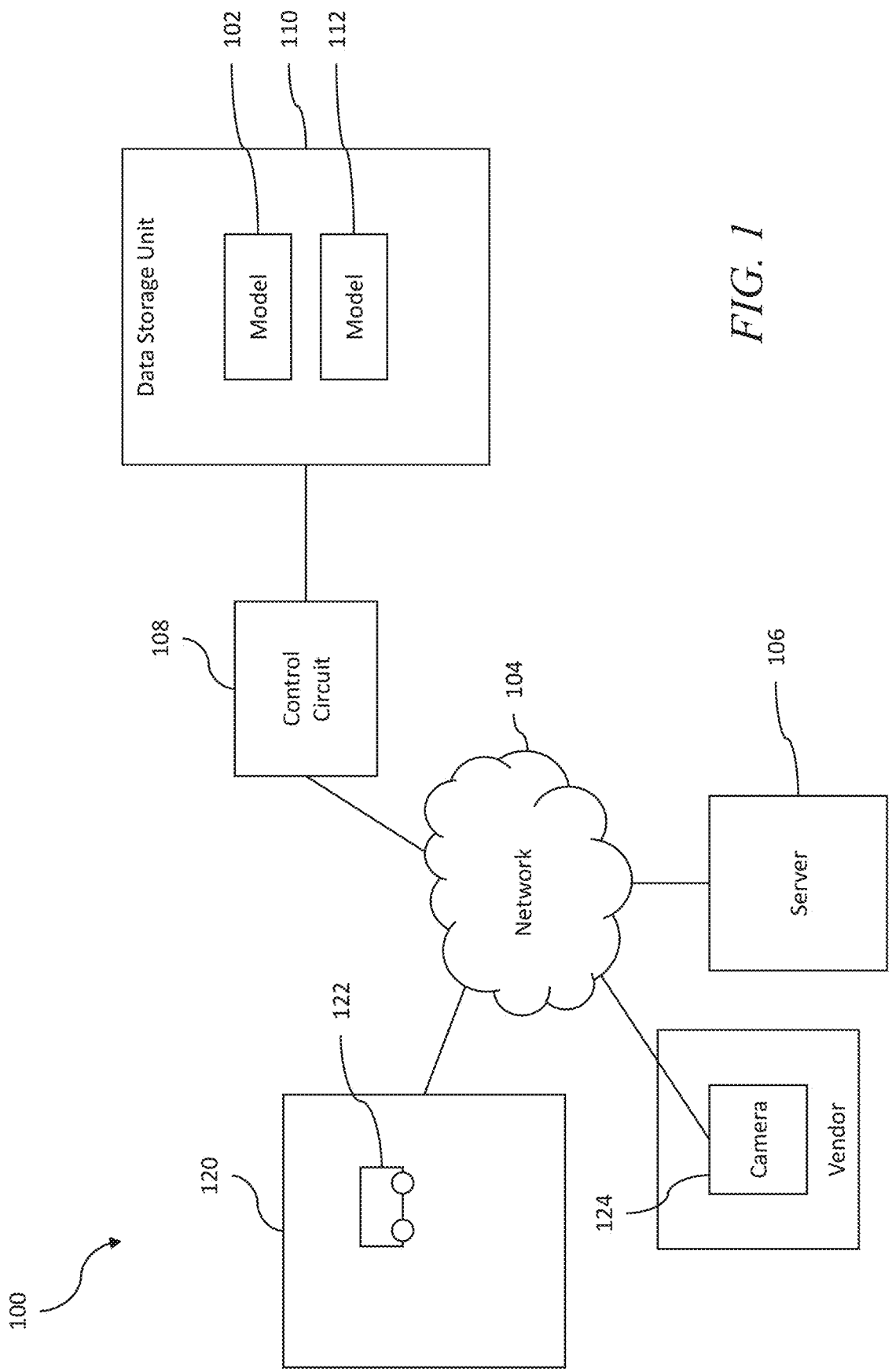
FIG. 1 comprises a diagram of a system as configured in accordance with various embodiments of these teachings.

Generally speaking and in the approaches presented herein, images of products are obtained from vendors or other entities. Segmentation first breaks the images into segments or regions, with the segments or the region having text or symbols. The segmented image is then separately applied to two different mathematical models (e.g., CNN-based models). Each model produces text boxes where potential text might exist. Then, a selective NMS algorithm is applied to the output of each model to produce a final group of text regions. These text regions are analyzed and actions taken. The actions could be to apply the informational content of the text to modify a website (e.g., a product catalog at the website), or to detect offensive language in the text. If offensive language is determined to exist, the vendor may be alerted and if the item already exists in a store or warehouse, the item can be removed.

The approaches presented herein provide an end-to-end text detection strategy combining a segmentation algorithm and an ensemble of multiple text detectors of different types to detect text in every individual image segment independently. In aspects, these approaches involve a super-pixel-based image segmenter which splits an image into multiple regions. In some examples, a convolutional deep neural architecture is developed that works on each of the segments and detects texts of multiple shapes, sizes and structures. It outperforms previous methods in terms of coverage in detecting texts in images especially the ones where the text of various types and sizes are compacted in a small region along with various other objects. Furthermore, the text detection and text recognizer approaches provided herein outperform previous approaches in extracting text from high entropy images. Entropy can be defined as the average information in an image and can be determined approximately from a histogram of multichannel and colour-space features. High entropy can be thought of, in one example, when the average information exceeds a threshold.

In other aspects, an ensemble modelling approach for feature extraction is provided by combining multiple Convolutional Neural Network (CNN) based models using selective non-maximal suppression. Ensemble model algorithm for detecting text of varying scales are utilized in each of the segments. In other aspects, a segmentation algorithm, which is tailor-fitted to segment out the regions of the image containing text, is provided. Additionally, an ensemble of multiple neural networks, which extract features from segments of the image, is utilized in order to detect text of varied sizes in the form of compact bounding boxes. The proposed architecture is highly parallelizable, and the results show comparable, and in cases, better accuracies in comparison to the competitors.

In many of these embodiments, a system includes a data storage unit, an electronic communication network, an electronic server, and a control circuit. The data storage unit includes a trained first mathematical model and a trained second mathematical model. The first mathematical model is different and distinct from the second mathematical model.

The electronic server is coupled to the electronic communication network and hosts a web-based catalog ordering system that receives electronic orders from customers.

The control circuit is coupled to the electronic communication network and the data storage unit. The control circuit is configured to receive an image of a product from a vendor via the electronic communication network. In aspects, the product is proposed by the vendor to be sold to retail customers.

The control circuit is configured to perform segmentation on the image to divide the image into individual regions of homogeneous pixels. The segmentation is effective to create a segmented image.

The control circuit is further configured to apply the segmented image to the first mathematical model to produce a first group of text regions and apply the segmented image to the second mathematical model to obtain a second group of text regions. Each of the text regions are regions that include potential text or symbols.

The control circuit is still further configured to apply a selective non-maximal suppression (sNMS) algorithm to the first group of text regions and the second group of text regions to obtain a final group of text regions. The selective NMS algorithm is effective to remove overlapping regions at the same location or general location in the image. The selective NMS algorithm selects text regions most likely to include text.

The control circuit is yet further configured to analyze informational content of the text regions and perform an action that utilizes the informational content of the text regions. The action can be applying the informational content to the web-based ordering catalog, receiving a customer order from a customer as a result of the informational content, and physically fulfilling the received customer orders using an automated order fulfilment system to ship items in the order to the customer. In another example, the action is scanning the informational content for offensive content, and sending a message to a vendor via the electronic network to remove the offensive content or removing the item from a retail store or warehouse when an item including the offensive content exists in the retail store or warehouse.

In aspects, the item that is removed from the retail store or warehouse is removed using an automated vehicle to navigate to the item and remove the item from a display unit or storage unit. In examples, the automated vehicle is an automated ground vehicle or an aerial drone. Other examples are possible.

In other aspects, the first group of text regions, the second group of text regions, and the final group of text regions comprise text boxes. In still other examples, the first mathematical model and the second mathematical model are convolutional neural networks (CNNs). Other examples are possible.

In examples, the first mathematical model and the second mathematical model are trained using training images.

In still other aspects, the system further comprises a camera. The camera is coupled to the electronic communication network and is configured to obtain the image.

In others of these embodiments, a data storage unit that includes a trained first mathematical model and a trained second mathematical model is provided. The first mathematical model is different and distinct from the second mathematical model.

An electronic communication network and an electronic server that is coupled to the electronic communication network are provided. The server hosts a web-based catalog ordering system that receives electronic orders from customers.

A control circuit that is coupled to the electronic communication network and the data storage unit is also provided. At the control circuit, an image of a product from a vendor via the electronic communication network is received. The product is proposed by the vendor to be sold to retail customers.

At the control circuit, segmentation is performed on the image to divide the image into individual regions of homogeneous pixels. The segmentation is effective to create a segmented image.

At the control circuit, the segmented image is applied to the first mathematical model to produce a first group of text regions. The segmented image is applied to the second mathematical model to obtain a second group of text regions. Each of the text regions are regions that include potential text or symbols.

At the control circuit, a selective non-maximal suppression (sNMS) algorithm is applied to the first group of text regions and the second group of text regions to obtain a final group of text regions. The selective NMS algorithm is effective to remove overlapping regions at the same location or general location in the image. The selective NMS algorithm selects text regions most likely to include text.

At the control circuit, informational content of the text regions is analyzed and an action determined and performed that utilizes the informational content of the text regions.

The action can be applying the informational content to the web-based ordering catalog, receiving a customer order from a customer as a result of the informational content, and physically fulfilling the received customer orders using an automated order fulfilment system to ship items in the order to the customer.

In another example, the action can be scanning the informational content for offensive content, and sending a message to a vendor via the electronic network to remove the offensive content or removing the item from a retail store or warehouse when an item including the offensive content exists in the retail store or warehouse. Other examples of actions are possible.

Referring now to FIG. 1, a system 100 for analyzing images is described. The system 100 includes a data storage unit 102, an electronic communication network 104, an electronic server 106, and a control circuit 108.

The data storage unit 102 is any type of electronic memory storage device. The data storage unit 102 includes a trained first mathematical model 110 and a trained second mathematical model 112. The trained first mathematical model 110 is different and distinct from the trained second mathematical model 112. In examples, the trained first mathematical model 110 is more accurate in results it provides than the trained second mathematical model 112. In other examples, the first mathematical model 110 provides a different structure (and thereby provides in some instances non-identical results) as compared to the second mathematical model 112.

The electronic communication network 104 is any type of electronic communication network such as the internet, a wireless network, a local area network, a wide area network, a cellular network, or combinations of these or other networks. Other examples of networks are possible.

The electronic server 106 is coupled to the electronic communication network 104 and hosts a web-based catalog ordering system that receives electronic orders from customers. The electronic server 106 may include control circuits, transceivers, other types of network communication devices, and/or electronic memory that allow it to host, control, interact with, or present an internet based catalog. The catalog has various types of information concerning products. The electronic server 106 may present the catalog to customers via the network 104 and receive customer orders via the network 104. As described herein, one result of the analysis of textual information is modification to (additions to, changes to, or deletions to) the electronic catalog. In structure, the catalog may be presented on at web pages that are presented to and allow interaction with customers. It will be appreciated that the displayed catalog will potentially change as the textual information is processed.

The control circuit 108 is coupled to the electronic communication network 104 and the data storage unit 102. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc.

These architectural options are well known and understood in the art and require no further description here. The control circuit 108 may be configured (for example, by using corresponding programming stored in a memory as will be well understood by those skilled in the art) to carry out one or more of the steps, actions, and/or functions described herein.

The control circuit 108 is configured to receive an image of a product from a vendor via the electronic communication network. The image may be in any format, e.g., a JPEG file. The product is proposed by the vendor to be sold to retail customers. In one example, the vendor of the product wishes to sell the product.

The control circuit 108 is also configured to perform segmentation on the image to divide the image into individual regions of homogeneous pixels. The segmentation is effective to create a segmented image as described elsewhere herein.

The control circuit 108 is further configured to apply the segmented image to the first mathematical model to produce a first group of text regions and apply the segmented image to the second mathematical model to obtain a second group of text regions. Each of the text regions are regions that include potential text or symbols. In aspects, the first group of text regions, the second group of text regions, and the final group of text regions comprise text boxes. In still other examples, the first mathematical model and the second mathematical model are convolutional neural networks (CNNs). Other examples of models are possible.

The control circuit 108 is still further configured to apply a selective non-maximal suppression (sNMS) algorithm to the first group of text regions and the second group of text regions to obtain a final group of text regions. The selective NMS algorithm is effective to remove overlapping regions at the same location or general location in the image. The selective NMS algorithm selects text regions most likely to include text.

The control circuit 108 is yet further configured to analyze informational content of the text regions and perform an action that utilizes the informational content of the text regions. The action can be applying the informational content to the web-based ordering catalog, receiving a customer order from a customer as a result of the informational content, and physically fulfilling the received customer orders using an automated order fulfilment system to ship items in the order to the customer.

In another example, the action is scanning the informational content for offensive content, and sending a message to a vendor via the electronic network to remove the offensive content or removing the item from a retail store or warehouse when an item including the offensive content exists in the retail store or warehouse.

In aspects, the item that is removed from the retail store or warehouse 120 is removed using an automated vehicle 122 to navigate to the item and remove the item from a display unit or storage unit. In examples, the automated vehicle 122 is an automated ground vehicle or an aerial drone. In aspects, the automated vehicle 122 may include levers, grips, arms, suction grips, and other mechanical features that allow the vehicle 122 to retrieve, move, grip, and/or transport products. It will also be understood that the movement and/or actions of the automated vehicle 122 represents with the retail store or warehouse 120 and/or items and fixtures (e.g., shelves) in the retail store or warehouse 120. Navigation may be made so as to avoiding collisions with humans or objects.

In examples, the first mathematical model 110 and the second mathematical model 112 are trained using training images. In aspects, a training set is created for multiple models by sampling an original training dataset and applying a "sampling with replacement" approach. In this approach, when a sampling unit is drawn from a finite population and is returned to that population, after its characteristic(s) have been recorded, before the next unit is drawn, the sampling is said to be "sampling with replacement."

In still other aspects, the system further comprises a camera 124. The camera 124 is coupled to the electronic communication network 106 and is configured to obtain the images. It will be appreciated that the images may be of any type or format (e.g., a JPEG format).

Figure 2:
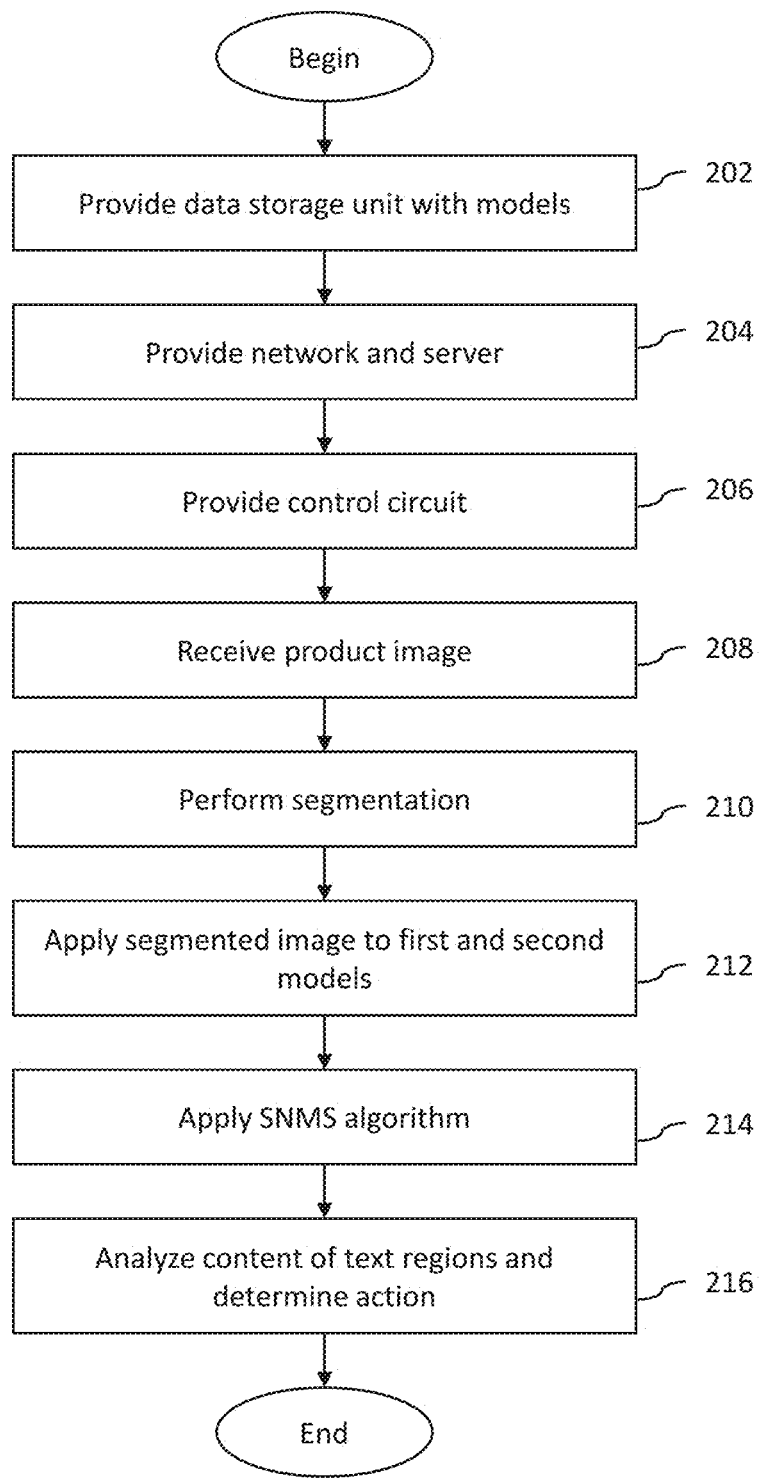
FIG. 2 comprises a flowchart as configured in accordance with various embodiments of these teachings.

Referring now to FIG. 2, one example of an approach for obtaining textual content in images is described. At step 202, a data storage unit that includes a trained first mathematical model and a trained second mathematical model is provided. The first mathematical model is different and distinct from the second mathematical model. For example, the models may be structured differently (e.g., different layers, number of layers, or weights) so that when the same input is applied to each, each will not necessarily produce the same output.

At step 204, an electronic communication network and an electronic server that is coupled to the electronic communication network are provided. The server hosts a web-based catalog ordering system that receives electronic orders from customers. The server manages the catalog ordering system. For example, the server manages the content of an electronic catalog, presents the catalog to customers, receives and manages orders, and sends electronic messages to order products that are shipped to customers.

At step 206, a control circuit that is coupled to the electronic communication network and the data storage unit is also provided.

At step 208 and at the control circuit, an image of a product from a vendor via the electronic communication network is received. The vendor proposes that the product is to be sold to retail customers. In one example, the vendor is a supplier, and a retail chain receives product proposals from vendors. The image may include potentially multiple views of the product including labels on the product, other markings on the product, the shape of the product, the colour of the product, and/or the packaging of the product. It will be appreciated that multiple images may be provided to show various features (e.g., one image may show the product itself, while another image may show the packaging, e.g., a box, of the product).

At step 210 and at the control circuit, segmentation is performed on the image to divide the image into individual regions of homogeneous pixels. The segmentation is effective to create a segmented image. The segmentation process is described in greater detail elsewhere herein.

At step 212 and at the control circuit, the segmented image is applied to the first mathematical model to produce a first group of text regions. The segmented image is applied to the second mathematical model to obtain a second group of text regions. Each of the text regions are regions that include potential text or symbols. In other words, application of the same input (the segmented image) to each model produces first and second groups of text regions that may or may not be the same. By using models that provide potentially different results, greater accuracy in determining textual areas is obtained.

At step 214 and at the control circuit, a selective non-maximal suppression (sNMS) algorithm is applied to the first group of text regions and the second group of text regions to obtain a final group of text regions. The selective NMS algorithm is effective to remove overlapping regions at the same location or general location in the image. The selective NMS algorithm selects text regions most likely to include text.

At step 216 and at the control circuit, informational content of the text regions is analyzed and an action determined and performed that utilizes the informational content of the text regions. Various types of actions are possible.

For example, the action can be applying the informational content to the web-based ordering catalog, receiving a customer order from a customer as a result of the informational content, and physically fulfilling the received customer orders using an automated order fulfilment system to ship items in the order to the customer.

In another example, the action can be scanning the informational content for offensive content, and sending a message to a vendor via the electronic network to remove the offensive content or removing the item from a retail store or warehouse when an item including the offensive content exists in the retail store or warehouse. Other examples of actions are possible.

Figure 3:
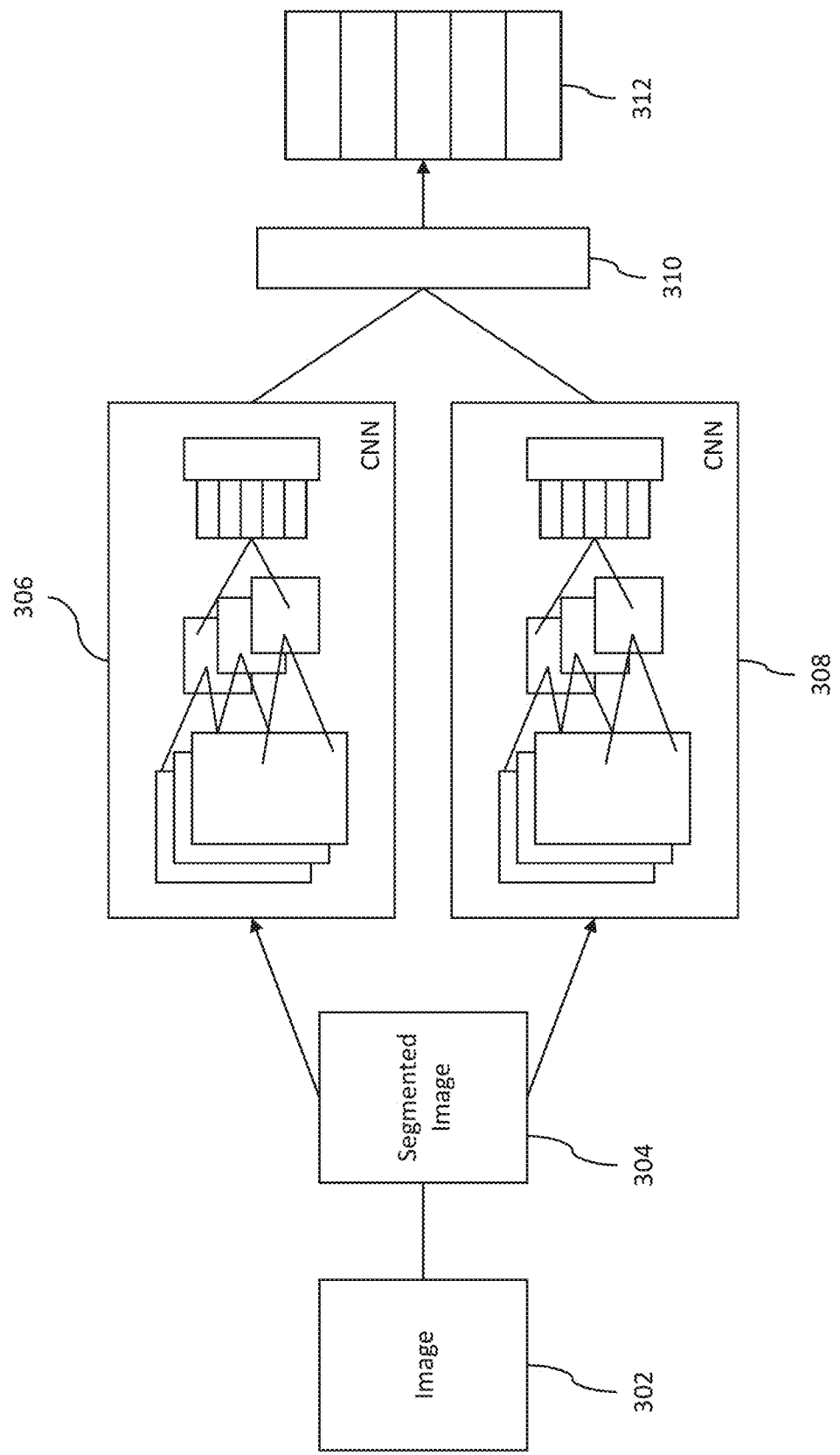
FIG. 3 comprises a diagram of a system as configured in accordance with various embodiments of these teachings.

Referring now to FIG. 3, one example of an image processing process is described. An image 302 is applied to a segmentation process that is applied to obtain a segmented image 304. The segmented image is applied to a first mathematical model 306 and a second mathematical model 308. Selective non-maximal suppression 310 is applied to the outputs of the models 306 and 308 to obtain a final group of text boxes 312.

Figure 4:
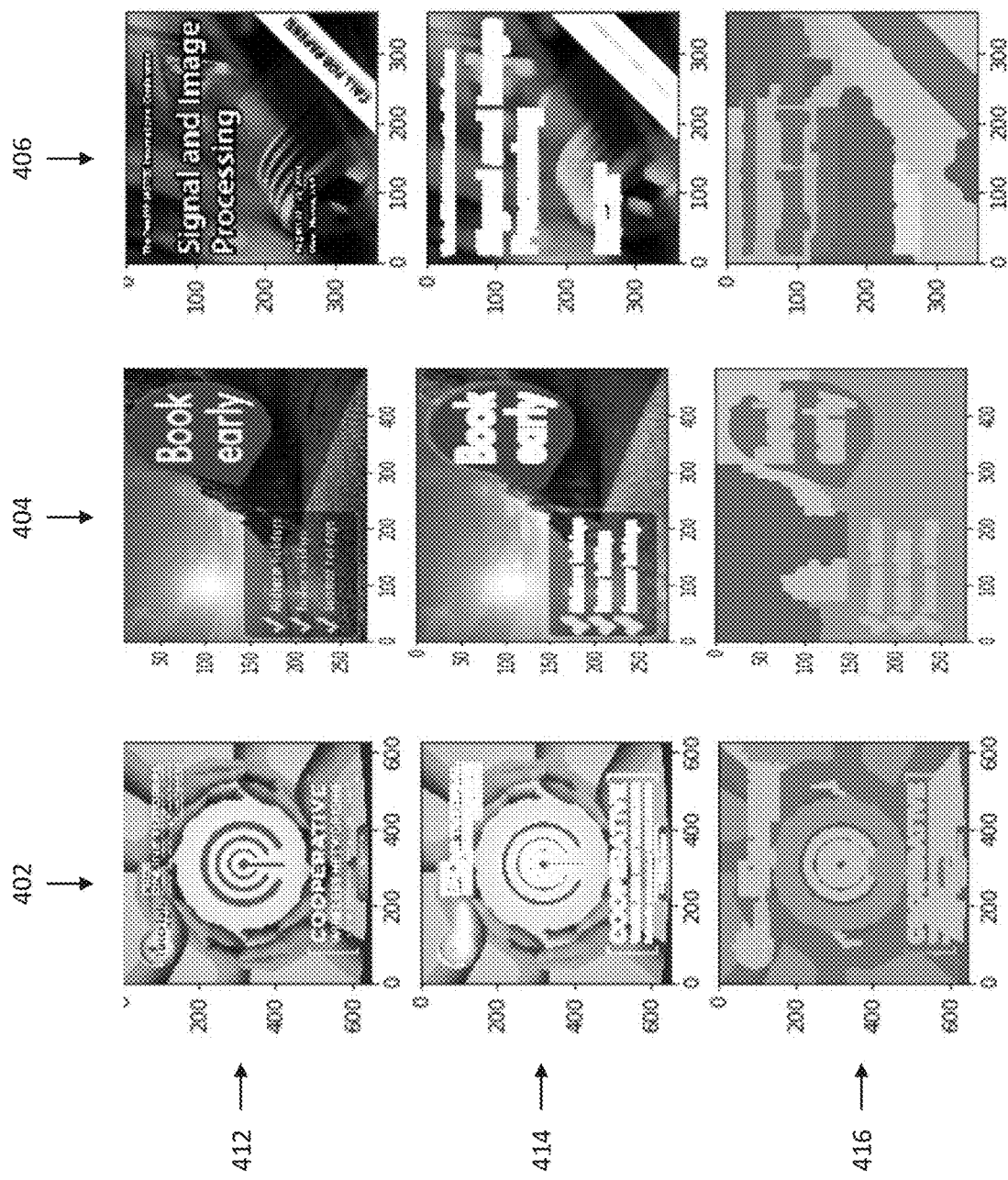
FIG. 4 comprises a diagram of a system as configured in accordance with various embodiments of these teachings.

Referring now to FIG. 4, one example of applying these approaches is described. Three different images are shown in columns 402, 404, and 406. For each of these images, an actual image is shown in row 412, a dilated image is shown in row 414, and a segmented image is shown in row 416.

Figure 5:
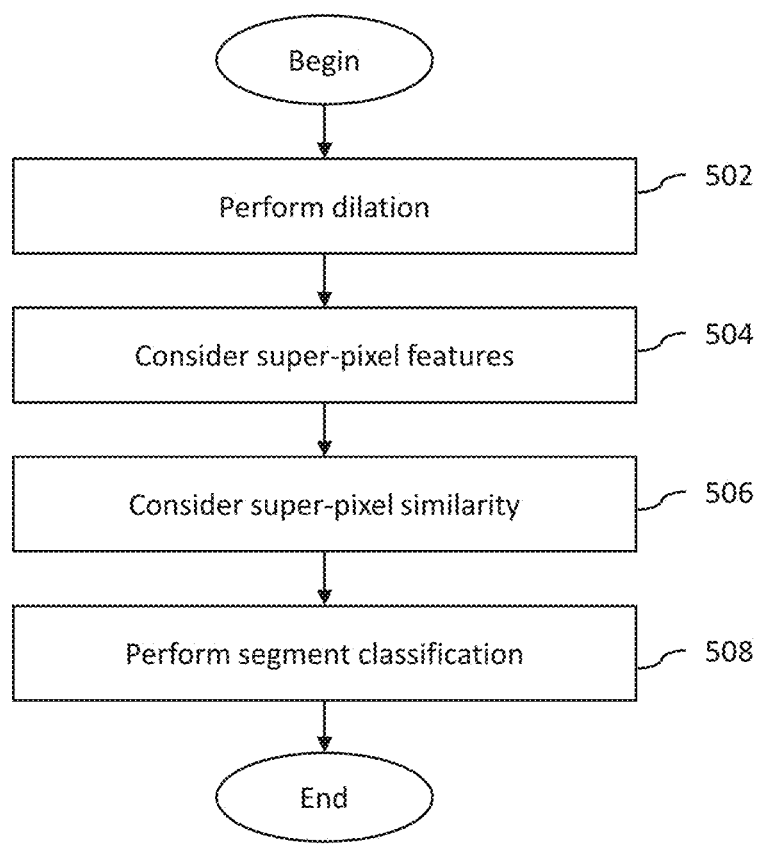
FIG. 5 comprises a flowchart as configured in accordance with various embodiments of these teachings.

Referring now to FIG. 5, the segmentation process is described. The proposed segmentation method consists of a number of intermediate steps resulting in spatially connected segments of homogeneous pixels. One goal of the segmentation module primarily is to ensure that the complete image is segmented into a number of regions such that the different text objects are enclosed in the individual regions. To ensure spatial continuity in the segments, dilation of the image is first performed to make sure the holes and gaps inside objects are nullified and small intrusions at object boundaries are somewhat smoothened. Super-pixels of fixed size in the dilated image are considered in order to calculate various features summarising super-pixel level information. Based on the super-pixel level feature information on the dilated image, a Gaussian Mixture model is fitted to identify the class of super-pixels in an unsupervised manner. The details of these steps are described below.

At step 502, dilation is performed. In aspects, the image dilation is performed by convolving the image with a suitable kernel, in one example, a Gaussian kernel. The anchor point of the kernel is chosen to be the center of the kernel. As the chosen kernel is scanned over the image, the pixel value at the anchor point is replaced by the maximum pixel value of the image region overlapping the kernel. This results in the interesting regions of the image to grow and the holes and gaps within the object to get nullified. As a result, the segments having the objects are over-compensated making sure there is less chance of a segment to truncate objects inside its true boundaries and split at holes and gaps within the object.

At step 504, super-pixel features are considered. For each super-pixel of fixed size $s \in S$, a calculation is made of a set of features as $x_s$. For each super pixel $s$ and each of the colour channels $c \in C$, calculations are obtained of mean, standard deviation and energy, denoted by $$x_{s,c}^{(1)} = [\mu_{s,c}, \sigma_{s,c}, e_{s,c}].$$

To summarize the texture features and in some aspects, a Leung-Malik filter bank at multiple scales and orientations is considered. In total and in some examples, considerations of first and second derivatives at 6 orientations, 8 Laplacians of Gaussian filters and 4 Gaussians are made, and, hence, the convolution is taken with the pixel at different channels. To make sure there is orientation invariance, the maximum response over all orientations at each pixel is taken. Calculations are made of the mean, standard deviation and energy for all pixels within a super-pixel for all the filter convolution to get features:

$$x_{s,c}^{(2)} = [\mu_{s,c,j}, \sigma_{s,c,j}, e_{s,c,j}]_{j \in \mathcal{F}},$$

for all colour channels $c \in C$ and super-pixel $s \in S$. The combined feature set for a given super-pixel is given by:

$$x_s = [x_{s,c}^{(1)}, x_{s,c}^{(2)}]_{c \in C}.$$

At step 506, super-pixel similarity is considered.

Following approaches as known in the art, the similarity of neighbourhood super pixels is incorporated based on a function:

$w(s,s')$, for all $s,s' \in S$.

Information available over the entire set of features and spatial distance is combined to calculate the similarity function $w(.,.)$ between neighbourhood super-pixels. The Euclidean distance between features of two super-pixels is denoted by $s,s'$ by $d(x_s, x_{s'})$ and the standard deviation across all super-pixels by $\sigma_x$. The spatial Euclidean distance between a pair of super-pixels is given by:

$$d(s,s')$$

and the average distance across all super-pixels by:

$$\bar{d}(S).$$

Combining the feature level information and spatial distance between super-pixels, the similarity function is given by:

$$w(s, s') = \exp\left(-\frac{d(x_s, x_{s'})}{2\sigma_x^2}\right)\left(\frac{d(s, s')}{\bar{d}(S)}\right)^{-1}.$$

At step 508, segment classification occurs. Based on the computed features and weight function we classify the super-pixels into a number of classes in an unsupervised manner. Let the unknown classes of the super-pixels be denoted by $Y = \{y_s, s \in S\}$. If there are K segments present in a given image, denoting K classes, we have $y_s \in \{1, 2, \ldots, K\}$ for $s \in S$. The class information given by the joint class probability function is factorized as:

$$p(Y) = \Pi_{s \in S} \pi(y_s) \Pi_{s,s' \in S} R(y_s, y_{s'})$$

where the class prior probabilities are given by $\pi(y_s)$. The mutual information between a pair of neighbourhood super-pixels are given by:

$$R(y_s, y_{s'}) = \beta w(s,s') B(y_s, y_{s'}),$$

$\beta > 0$ being a tuning parameter controlling the spatial regularization. Here $B(y_s, y_{s'})$ is a spatial regularisation function indicating the chance of two neighbouring superpixels to belong to the same class. A diagonal structure of the matrix $B(y_s, y_{s'})$, $s,s' \in S$ is chosen making all the diagonal elements to be identical to 1. Given a fixed class k, the features are assumed to have a Gaussian distribution with fixed mean $\mu_k$ and variance-covariance matrix $\Sigma_k$ given by:

$$p(x_s|y_s=k)=N_k(\mu_k, \blacksquare_k),$$

Hence, the super-pixel class is predicted by estimating the model parameters using the Expectation-Maximization algorithm and hence evaluating:

$$(\hat{y}_s, s \in S) = \text{ArgMax}_{y_s, s \in S} \prod_{s \in S} p(x_s | y_s) \pi(y_s) \prod_{s,s' \in S} R(y_s, y_{s'}).$$

The estimated class information of the super-pixels is used to merge super-pixels of the same class level to get different segments. For three selected examples of images, the results of the proposed strategy after the dilation and segmentation are shown, for example, in FIG. 4.

In some examples, the text detection strategy of the approaches described herein use an ensemble of the CNN models to probe in each of the detected segments to extract texts of various sizes. The task of text detection in an image is very similar to object detection, where the text can be treated as an object. Hence, all object detection models can be used by making them binary classifiers—text (word level) and non-text. But all these object classifiers have their own limitations.

Sometimes the image has a large amount of text compacted in a region forming a text cluster. Detecting these words separately becomes hard for conventional object detection techniques as they are trained to recognize a few numbers of separable objects in an image.

Text in a single image can vary in both font-sizes and font-styles in a single image. Although it is sometimes claimed that most object detection methods are scale invariant, the results say otherwise as known to those skilled in the art. Text in most cases, unlike objects, has a rectangular aspect ratio. Wide kernels will capture information about the aspect ratio of text objects better than square kernels. An ensemble of multiple CNN based models ensures a different level of information will be captured by different kind of models resulting in better coverage in information gathered from image.

The models are then stitched together using selective non-max suppression algorithm. Non-Maximal Suppression removes multiple overlapping boxes detected for the same text location and keeps the one with the highest probability. Selective non-maximal suppression does the same but also takes into account the accuracy of the model from which the bounding box has been generated, giving it higher preference. Predictions from models which have a higher accuracy are preferred over others even if the individual probability might be slightly smaller.

Non-Maximal suppression approaches are now described. Let us assume that there are n models and the number of bounding boxes predicted by $j^{th}$ model be $n_j$. Let K be the list of all bounding boxes such that $k_{ij}$ is the $i^{th}$ bounding box predicted by model j with $p_{kij}$ being the probability of that bounding box containing text.

Let $\ell$ represent a sorted ordering of all these bounding boxes. That implies $$|\ell|=|K|=n_1+n_2+n_3+ \ldots +n_n.$$

One example of an NMS algorithm is:

---
Algorithm 1 NMS Algorithm
---
procedure NMSALGORITHM(k, p, nmsThreshold)
   $\ell$ = sort(k, p, desc)     ▷ sort k based on prob. p in desc order
   for i = 1,...,|$\ell$| do
     for j = i + 1,...,|$\ell$| do
       if IOU($\ell_i, \ell_j$) > nmsThreshold then
         $\ell$.pop(j)
       end if
     end for
   end for
   return $\ell$
end procedure Selective non-maximal suppression (sNMS) is now described. Let $M_q$ denote the model with the highest accuracy $a_q$ among all other models $M_i$ where $i \in \{1, 2, \ldots, n\}$. Let $P_t$ be the threshold probability—the probability that the bounding box is considered a true text box predicted by a model. $P_t$ is kept high for $M_q$, say $P_{th}$ while $P_t$ is kept slightly lower for the other n 1 models, say $P_{tl}$. The bounding boxes predicted by each of the models are first filtered using this. After that, the probability of all the $n_q$ predicted boxes of model $M_q$ is assigned to 1, while the probability of other boxes is left untouched. Post this reassignment of probabilities, NMS is performed on all the predicted boxes from all n models.

One example of a sNMS algorithm is:

---
Algorithm 2 Selective NMS Algorithm
---
procedure SELECTIVENMSALGORITHM(a, $P_{t_1}$, $P_{t_2}$, k, p, nmsThreshold)
   q = max(a)
   for $k_q$ do       ▷ bounding boxes in $q^{th}$ model
     remove boxes where $p_q < P_{t_h}$
   end for
   for $k_q$ do       ▷ remaining bounding boxes in $q^{th}$ model
     $p_q = 1$
   end for
   for r = 1,...,q − 1,q + 1,...,m do
     for $k_r$ do
       remove boxes where $p_r < P_{r_l}$
     end for
   end for
   bbs =NMSalgorithm(k, p, nmsThreshold)
   return bbs
end procedure It will be appreciated that selective NMS ensures that the text boxes predicted with high probability by a model with the highest accuracy will always have priority over similar text boxes predicted with high probability by other models.

In one practical application, multiple models are deployed and used to detect text from an image, which are stitched together using the selective-NMS algorithm. Multiple pre-trained models, (e.g., as developed in Liao et al.) were used to detect text boxes from images. For selective-NMS, corresponding to the model with the highest accuracy of 0:9 was set as a probability threshold above which a bounding box was considered a true text box with high confidence. The same parameter was set to 0.8 for the other models. NMS Threshold, the ratio of intersection area of two text boxes to union area of them (IOU), was set to 95%, i.e., with IOU above 95% between two text boxes, they are considered to contain the same text. For text recognition, 9 million text images were synthesized using a SynthText tool for various size, style and background of text for training. The full training set was run in a computer with standard K80 GPU and average execution time for detecting text in a single image is recorded to be around 0:15 s.

The ICDAR2013 dataset consists of images where the user is explicitly directing the focus of the camera on the text content of interest in a real scene. The product image dataset used (a Walmart dataset), on the other hand, consisted of images of items taken from a high-resolution camera and have no background (white). By converting the image to grey-scale the entropy of the images was calculated in areas where the text is present. The average entropy of a sample of images from ICDAR2013 dataset was around 7:0 while that of images from the Walmart dataset was around 6:0 with 6:5 marking a demarcation boundary for separating the two datasets.

Some experimental results are now described. ICDAR2013 contains high-resolution real-world images. The models had been trained on the ICDAR2013 training set and then tested on the ICDAR2013 validation set. The results from all the models were then passed through selective NMS and the final bounding boxes are used for computing the metrics for precision, recall and f-score. Table.1 summarizes and compares the results of the approaches provided herein (denoted by "Ensemble") with other methods from other sources or products (MMser, Textflow, FCN, SSD, Textboxes and Textboxes++).

TABLE 1

| Methods | Datasets ICDAR2013 | | | |
|---|---|---|---|---|
| | P | R | F | Time/s |
| MMser (Zamberletti, Noce, and Gallo 2014) | 0.86 | 0.70 | 0.77 | 0.75 |
| TextFlow (Tian et al. 2015) | 0.85 | 0.76 | 0.80 | 1.4 |
| FCN (Zhang et al. 2016) | 0.88 | 0.78 | 0.83 | 2.1 |
| SSD (Liu et al. 2016) | 0.80 | 0.60 | 0.68 | 0.1 |
| Textboxes | 0.86 | 0.74 | 0.80 | 0.09 |
| Textboxes++ | 0.86 | 0.74 | 0.80 | 0.10 |
| Ensemble | 0.83 | 0.77 | 0.80 | 0.15 |

In Table 1: Text localization on ICDAR2013. "Time" refers to the execution time of the computer code implementing an approach. P, R and F refer to precision, recall and F-measure respectively. Precision=number of correctly predicted text boxes/total number of predicted textboxes. Recall=number of correctly predicted text boxes/total number of text boxes in the image. F measure=2*((precision*recall)/(Precision+recall)).

The ensemble model proved herein was also tested on a dataset containing publicly available product images on the Walmart, Inc. website. These are high resolution and high entropy images of the front face of processed food items used on a daily basis by consumers. The predicted text region bounding boxes enclose regions containing texts of multiple sizes and mixed font types in the same image. This is particularly important for product images as the product labels often contain texts of multiple fonts. The proposed text detection strategy also successfully detects text regions when the text is moderately rotated or curved due to the shape of the product package, e.g., a can or a bottle (see the 2nd, 3rd and 4th images in the bottom row in FIG. 4). The use of wide kernels is useful in detecting horizontal text boxes and on top of it, the image segmentation and CNN ensemble network consider image convolution filters at multiple scales and rotation angles. This contributes to ensuring that the text box detection accuracy is invariant at least under limited distortion and rotation of the horizontal orientation of the text.

The models trained on ICDAR2013 training set were used on 50 images from this dataset where the ground truth boxes are known. The main difference between the images in this dataset and the other publicly available datasets is that the images have no background noise that is usually present in scene text. However, multiple texts are usually present in a small region of the image along with various other objects resulting in high local entropy. Most of the models currently available perform poorly on detecting text in such regions in the image. In such cases, the approaches provided herein perform better than the existing ones in terms of precision, recall as well as f-score. In the case of ICDAR2013 dataset, the model has performed at par with the existing models currently available, but this improves drastically in the case of the dataset containing high entropy images. The precision is at least 6% higher than the existing methods while recall is higher by around 15%. Table 2 compares the results achieved on the Walmart high entropy images.

TABLE 2

| Methods | Datasets High Entropy Images | | |
|---|---|---|---|
| | P | R | F |
| Textboxes | 0.867 | 0.264 | 0.405 |
| Textboxes++ | 0.831 | 0.311 | 0.453 |
| Ensemble | 0.920 | 0.467 | 0.619 |

Table 2 shows text localization results on high entropy image dataset. P, R and Frefer to precision, recall and F-measure respectively. Precision=number of correctly predicted text boxes/total number of predicted textboxes. Recall=number of correctly predicted text boxes/total number of text boxes in the image. F measure=2*((precision*recall)/(Precision+recall)).

The approaches provided herein provide algorithms, which employ an ensemble of multiple fully convolutional networks preceded by an image segmenter for text detection. These approaches are highly stable and parallelizable and can detect words of varied sizes in an image which is very high on entropy. Comprehensive evaluations and comparisons on benchmark datasets clearly validate the advantages of these approaches in three related tasks including text detection, word spotting and end to-end recognition. It even exhibits better performance than the Textbox and Textbox++ products/approaches in detecting graphical text in an image. The ICDAR2013 dataset images have real-world contents and background noise surrounding the true text regions, unlike the Walmart high entropy images, where the challenge is largely the presence of multiple textual elements within small regions resulting higher entropy. The approaches provided herein are particularly targeted to work on such high entropy text regions and hence performs very well on high Entropy Images. However, a more targeted background removal strategy, image segmentation and text candidate pre-filtering using text region specific key point identification and feature descriptions such as Stroke width descriptors, Maximally Stable Extremal Region descriptors will enhance the performance of the CNN ensemble model even more.

In some embodiments, one or more of the exemplary embodiments include one or more localized IoT devices and controllers (e.g., included with or associated with the various scanners, sensors, cameras, or robots described herein). In another aspect, the user electronic devices or automated vehicles may be seen as an IoT device. As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modelled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect generic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system, comprising:
    a data storage unit including a trained first mathematical model and a trained second mathematical model, wherein the first mathematical model is different and distinct from the second mathematical model;
    a control circuit that is coupled to an electronic communication network and the data storage unit, wherein the control circuit is configured to:
        receive an image of a product via the electronic communication network;
        perform segmentation on the image to divide the image into individual regions of homogeneous pixels to create a segmented image;
        apply the segmented image to the first mathematical model to produce a first group of text regions and apply the segmented image to the second mathematical model to obtain a second group of text regions, wherein each of the text regions includes potential text or symbols;
        analyze informational content of first and second text regions for offensive content and perform an action that utilizes the informational content of the first and second text regions, the action being one or more of:
            modifying a website indicating the product for sale when the offensive content is found;
            sending a message to a vendor supplying the product via the electronic network when the offensive content is found;
            preventing the item from being made available to a customer when offensive content is found; and
            removing the product from an available product listing when the offensive content is found.

2. The system of claim 1, wherein the control circuit is further configured to apply a selective non-maximal suppression (sNMS) algorithm to the first group of text regions and the second group of text regions to obtain a final group of text regions, the selective NMS algorithm being effective to remove overlapping regions at the same location or general location in the image, the selective NMS algorithm selecting text regions to include text.

3. The system of claim 1, wherein preventing the item from being made available to the customer when offensive content is found comprises removing the item from a retail store or a warehouse.

4. The system of claim 3, wherein the removing uses an automated vehicle to navigate to the item and remove the item from a display unit or storage unit.

5. The system of claim 4, wherein the automated vehicle is an automated ground vehicle or an aerial drone.

6. The system of claim 1, wherein the first group of text regions, the second group of text regions, and a final group of text regions comprise text boxes.

7. The system of claim 1, wherein the first mathematical model and the second mathematical model are convolutional neural networks (CNNs).

8. The system of claim 1, wherein the first mathematical model and the second mathematical model are trained using training images.

9. The system of claim 1, further comprising a camera, the camera configured to obtain the image.

10. The system of claim 1, further comprising a web-based catalog ordering system that receives electronic orders from customers.

11. A method, comprising:
    providing a data storage unit, the data storage unit including a trained first mathematical model and a trained second mathematical model, wherein the first mathematical model is different and distinct from the second mathematical model;
    providing a control circuit that is coupled to an electronic communication network and the data storage unit, wherein the control circuit is configured to:
        at the control circuit, receiving an image of a product via the electronic communication network;
        at the control circuit, performing segmentation on the image to divide the image into individual regions of homogeneous pixels to create a segmented image;

at the control circuit, applying the segmented image to the first mathematical model to produce a first group of text regions and apply the segmented image to the second mathematical model to obtain a second group of text regions, wherein each of the text regions includes potential text or symbols;

at the control circuit, analyzing informational content of first and second text regions for offensive content and performing an action that utilizes the informational content of the first and second text regions, the action being one or more of:

modifying a website indicating the product for sale when the offensive content is found;

sending a message to a vendor supplying the product via the electronic network when the offensive content is found;

preventing the item from being made available to a customer when offensive content is found; and removing the product from an available product listing when the offensive content is found.

12. The method of claim 11, further comprising at the control circuit applying a selective non-maximal suppression (sNMS) algorithm to the first group of text regions and the second group of text regions to obtain a final group of text regions, the selective NMS algorithm being effective to remove overlapping regions at the same location or general location in the image, the selective NMS algorithm selecting text regions to include text.

13. The method of claim 11, wherein preventing the item from being made available to the customer when offensive content is found comprises removing the item from a retail store or a warehouse.

14. The method of claim 13, wherein the removing uses an automated vehicle to navigate to the item and remove the item from a display unit or storage unit.

15. The method of claim 14, wherein the automated vehicle is an automated ground vehicle or an aerial drone.

16. The method of claim 11, wherein the first group of text regions, the second group of text regions, and a final group of text regions comprise text boxes.

17. The method of claim 11, wherein the first mathematical model and the second mathematical model are convolutional neural networks (CNNs).

18. The method of claim 11, further comprising training the first mathematical model and the second mathematical model using training images.

19. The method of claim 11, further comprising providing a camera, the camera being configured to obtain the image.

20. The method of claim 11, further comprising providing a web-based catalog ordering system that receives electronic orders from customers.

\* \* \* \* \*